(12) United States Patent
Xiong et al.

(10) Patent No.: US 11,072,072 B2
(45) Date of Patent: Jul. 27, 2021

(54) ROBOT RECHARGE DOCKING METHOD AND ROBOT WITH THE SAME

(71) Applicant: UBTECH Robotics Corp, Shenzhen (CN)

(72) Inventors: Youjun Xiong, Shenzhen (CN); Jiawen Hu, Shenzhen (CN); Gaobo Huang, Shenzhen (CN); Musen Zhang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 293 days.

(21) Appl. No.: 16/370,884

(22) Filed: Mar. 30, 2019

(65) Prior Publication Data
US 2020/0030982 A1    Jan. 30, 2020

(30) Foreign Application Priority Data

Jul. 25, 2018  (CN) .......................... 201810826961.6

(51) Int. Cl.
*B25J 9/16*    (2006.01)
*B25J 19/00*   (2006.01)

(52) U.S. Cl.
CPC ........... *B25J 9/1676* (2013.01); *B25J 9/1694* (2013.01); *B25J 19/005* (2013.01)

(58) Field of Classification Search
CPC .... G05D 1/0038; G05D 1/005; G05D 1/0212; G08B 13/1672
See application file for complete search history.

(56) References Cited

U.S. PATENT DOCUMENTS

| | | | |
|---|---|---|---|
| 6,764,373 B1* | 7/2004 | Osawa | B25J 19/005 180/169 |
| 8,515,580 B2* | 8/2013 | Taylor | G05D 1/0225 700/259 |
| 9,468,349 B2* | 10/2016 | Fong | B25J 9/1664 |
| 10,019,013 B2* | 7/2018 | Kwak | A47L 9/2847 |
| 10,251,159 B1* | 4/2019 | Deyle | G06F 11/14 |
| 10,265,859 B2* | 4/2019 | Deyle | B25J 11/008 |
| 10,279,488 B2* | 5/2019 | Li | B60L 53/305 |
| 10,399,443 B2* | 9/2019 | Kwa | H02J 7/0042 |
| 10,486,485 B1* | 11/2019 | Levinson | B60G 17/0165 |

(Continued)

FOREIGN PATENT DOCUMENTS

| | | |
|---|---|---|
| CN | 206117207 U | 4/2017 |
| CN | 107608358 A | 1/2018 |

*Primary Examiner* — Nicholas Kiswanto (57) ABSTRACT

The present disclosure provides a robot recharge docking method. The method includes: obtaining current radar data of a radar of a robot for a scanned obstacle; obtaining a position of a target object by analyzing the current radar data; controlling the robot to move to a predetermined position around the target object; determining whether infrared carrier data is received by the robot recharge docking apparatus from the target object; determining that the target object is a charging station upon receiving the infrared carrier data from the target object; and docking the robot at the target object to charge if the target object is the charging station. In the above-mentioned manner, the present disclosure can prevent the robot from taking an obstacle similar to a charging station in shape as the charging station to dock at, thereby ensuring the safety of the automatic recharging of the robot.

20 Claims, 8 Drawing Sheets

(56) References Cited

U.S. PATENT DOCUMENTS

2016/0349362 A1* 12/2016 Rohr .................... G01S 5/0263
2019/0049242 A1*  2/2019 Adams .................. G01C 25/00
2019/0180467 A1*  6/2019 Li ........................ G01S 17/931

* cited by examiner

ROBOT RECHARGE DOCKING METHOD AND ROBOT WITH THE SAME

CROSS REFERENCE TO RELATED APPLICATIONS

This application claims priority to Chinese Patent Application No. CN201810826961.6, filed Jul. 25, 2018, which is hereby incorporated by reference herein as if set forth in its entirety.

BACKGROUND

1. Technical Field

The present disclosure relates to intelligent robot technology, and particularly to a robot recharge docking method and a robot with the same.

2. Description of Related Art

In the prior art, the basic method for automatically recharging a robot by using at radar is to enable the robot to use the radar to scan and identify a charging station first, and enable the robot to control a chassis of the robot to move to the front of the charging station, and then dock at the charging station for charging.

In which, the method of scanning and identifying the charging station by the radar of the robot is generally realized by analyzing the collected radar data in a overall manner. By analyzing the feature shape in the radar data, the feature shape is compared with a shape feature corresponding to the height of the radar of the specified charging station to obtain the matchingness therebetween. If the degree of matchingness exceeds a specified threshold, it is considered to have been found the charging station. However, in a specific application scenario, even if the degree of matchingness exceeds the specified threshold, it is possible to have identification errors such as identifying an obstacle similar to a charging station in shape as the charging station to dock at, which may cause safety issue of the robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
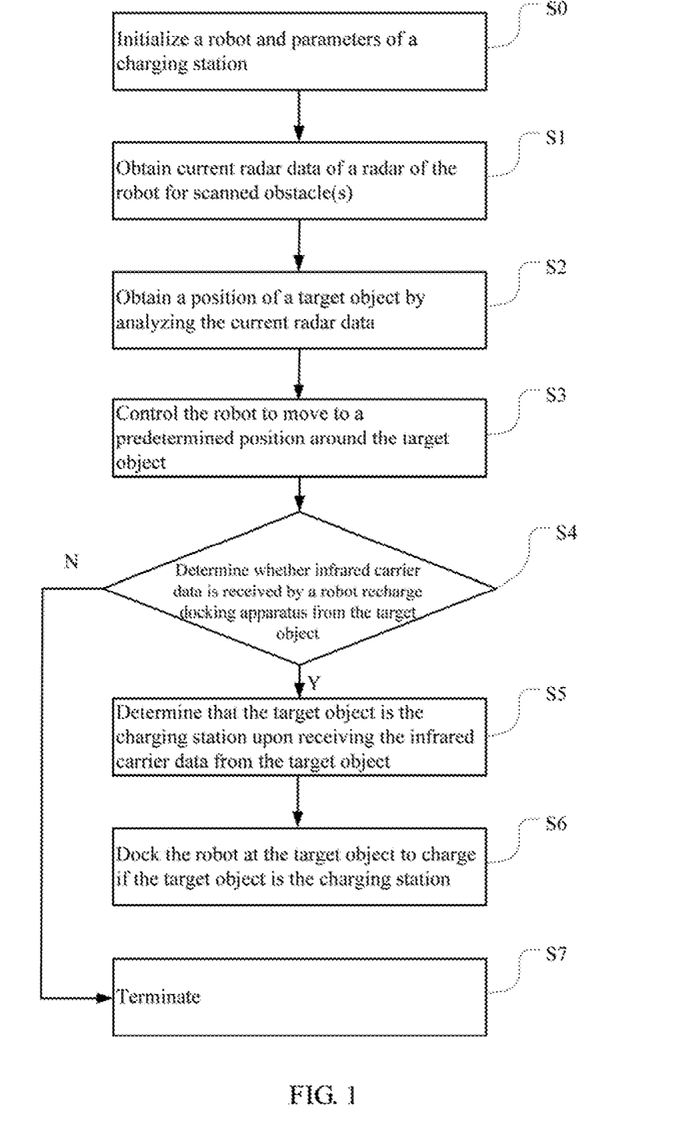
FIG. 1 is a flow chart of a robot recharge docking method according to an embodiment of present disclosure.
Figure 7:
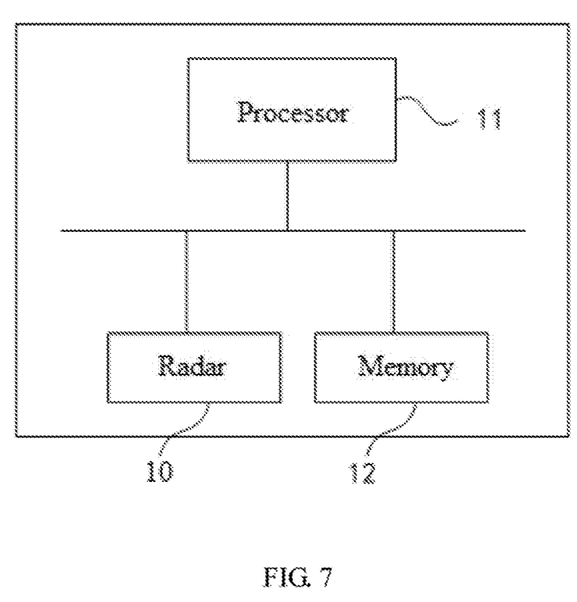
FIG. 7 is a schematic block diagram of a robot according to an embodiment of present disclosure.

FIG. 1 is a flow chart of a robot recharge docking method according to an embodiment of present disclosure. In this embodiment, a robot recharge docking method is provided. The method is a computer-implemented method executable for a processor, which may be implemented through a robot as shown in FIG. 7, or through a storage medium. The method may be applied to a robot having a radar. As shown in FIG. 1, the method includes the following steps.

S0: initializing the robot and parameters of a charging station.

Before starting a docking using radar scanning, it needs to initialize the robot and the parameters of the charging station. In which, the parameters may include, but is not limited to, at least one of a size of the charging station (e.g., the radius of an arc of the charging station), an identification error range of the size (of the arc of the charging station), a covariance error range, a size (e.g., radius) of a chassis of the robot, a distance of a predetermined position and a center point of (a circular surface of) the charging station, a predetermined trajectory of the robot, and a movement speed of the robot, which are not limited herein.

Figure 2:
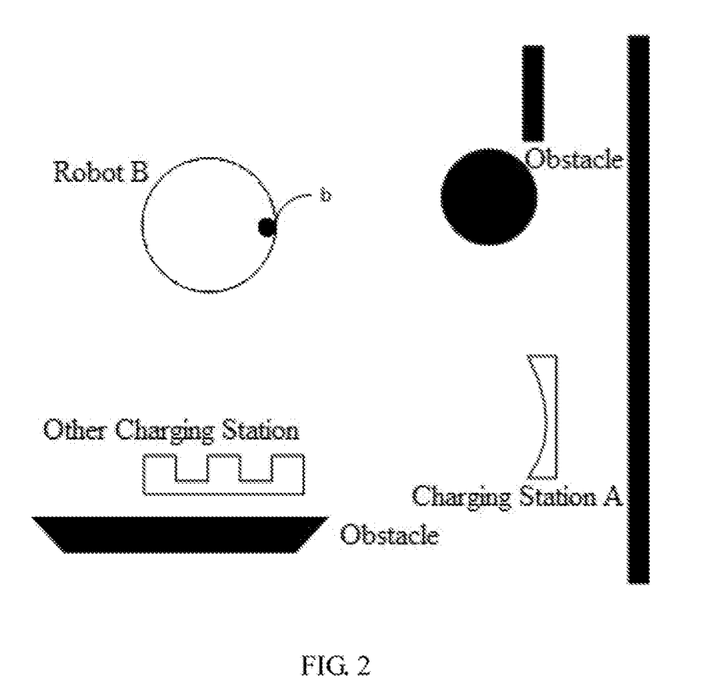
FIG. 2 is a schematic diagram of an application scenario of the robot recharge docking method of FIG. 1.

FIG. 2 is a schematic diagram of an application scenario of the robot recharge docking method of FIG. 1. As shown in FIG. 2, in this embodiment, a charging station A of the robot may be an arc shape typed charging station, that is, a charging surface of the charging station A may be an arc surface. In other embodiments, the charging station A may also be a square shape typed charging station, a zigzag shape typed charging station, a wave shape typed charging station, or the like, which is not limited herein. In this embodiment, the arc shape typed charging station is taken as an example to introduce the radar recharge docking method, and the radar recharge docking method for other shape typed charging stations will be similar.

In this embodiment, a radar b is disposed on a body of the robot B, and a front feature shape of the robot is an arc shape, that is, the radius of a chassis of the robot and the radius of the arc (of the charging surface) of the charging station are the same. Furthermore, in the application scenario, there are various obstacles around the charging station A, which includes other types of charging stations and other obstacles other than the charging station. In this embodiment, the method can accurately find the charging station corresponding to the robot among various obstacles.

S1: obtaining current radar data of the radar of the robot for scanned obstacle(s).

In step S1, a polar coordinate system is first established with the robot as an origin center, and the front of the robot is taken as the X-axis direction, and the left front of the robot is taken as the Y-axis direction. The position of each point scanned by the radar is an position in the coordinate system corresponding to the robot.

Figure 3:
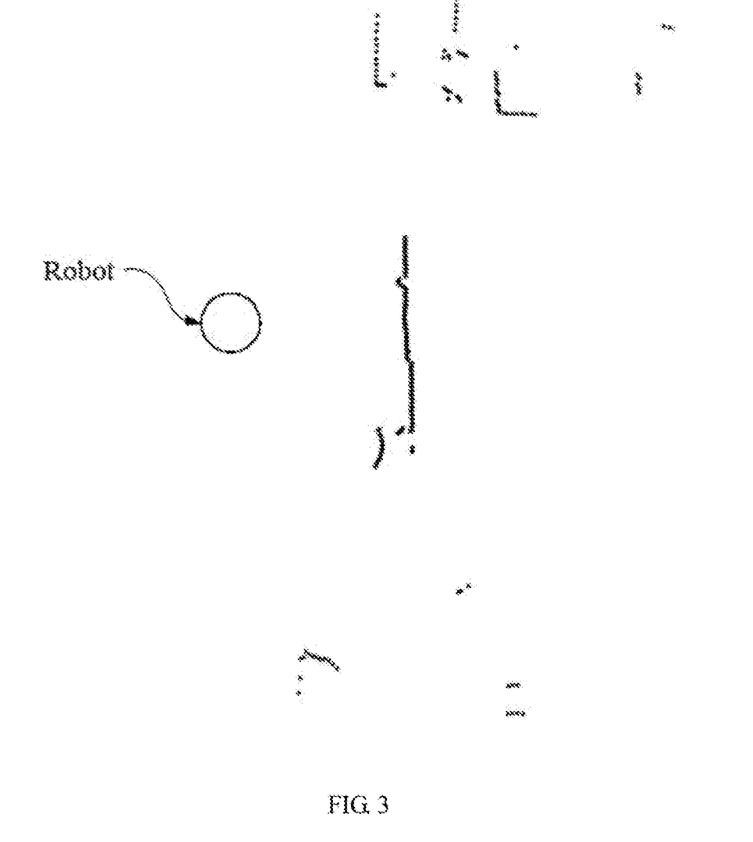
FIG. 3 is a schematic diagram of raw data obtained by a radar through scanning obstacles according to the robot recharge docking method of FIG. 1.

In one embodiment, after the chassis is rotated by a specified angle, the radar obtains radar data of all obstacles within the range of the angle. In which, the current radar data is data of the orientation and the distance of the obstacles and the radar which is generated when the radar scans the surrounding obstacles, which is also represented using the above-mentioned polar coordinate system, and at least includes an angle and a distance with respect to the origin center. FIG. 3 is a schematic diagram of raw data obtained by a radar through scanning obstacles according to the robot recharge docking method of FIG. 1. As shown in FIG. 3, the circle represents the robot, and the dotted lines represent the distance, orientation, and size of the obstacle which are obtained by the radar after scanning the obstacles. In which, the higher the angular resolution of the radar, the more the scanning points of the radar with respect to the obstacles of a specific position and size.

S2: obtaining a position of a target object by analyzing the current radar data.

Figure 4:
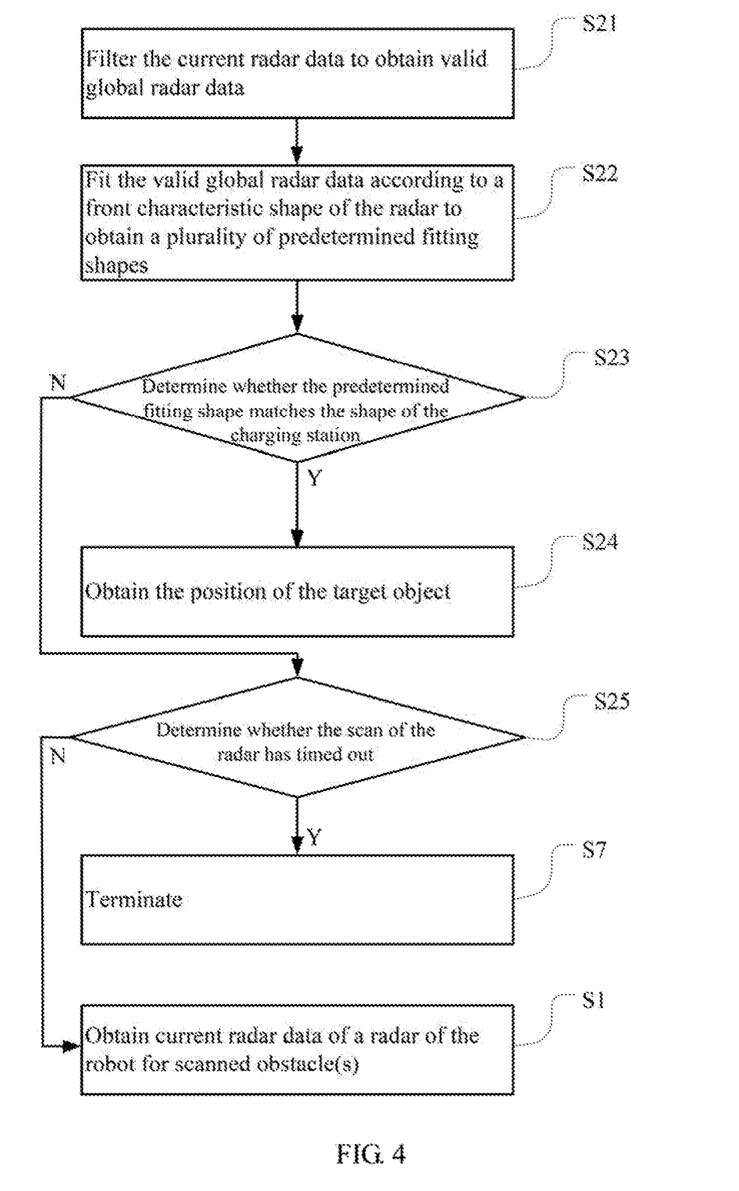
FIG. 4 is a flow chart of step S2 of the robot recharge docking method of FIG. 1.

The target object may be the charging station or other obstacles. FIG. 4 is a flow chart of step S2 of the robot recharge docking method of FIG. 1. As shown in FIG. 4, step S2 further includes the following sub-steps.

S21: filtering the current radar data to obtain valid global radar data.

In the current radar data obtained in step S1, it is necessary to eliminate a part of the radar data that does not meet the requirements, which includes the data with a distance of 0 from the origin center and some data that has been identified as invalid by a sensor of the radar. The angle information and distance information of all the obstacles with respect to the radar which is remained after eliminating the part of the radar data is global radar data.

S22: fitting the valid global radar data according to a front feature shape of the radar to obtain a plurality of predetermined fitting shapes.

After the global radar data is obtained in step S21, by using the front feature shape (i.e., the arc shape) of the radar and the global radar data to perform a matchingness analysis, it can be fitted to obtain a fitted circle. That is, in this embodiment, the position of the target object such as the charging station can be obtained by a specific algorithm. In which, the global radar data can be fitted by a least squares method to obtain the fitted circle. In other embodiments, for other shape typed charging stations, the global radar data can be fitted by other fitting methods to obtain the predetermined fitting shape. For example, if the charging station is square shape typed, the predetermined fitting shape obtained by using the fitting algorithm is similar to the shape of the charging surface of the square charging station.

S23: determining whether the predetermined fitting shape matches a shape corresponding to the charging station.

Figure 5:
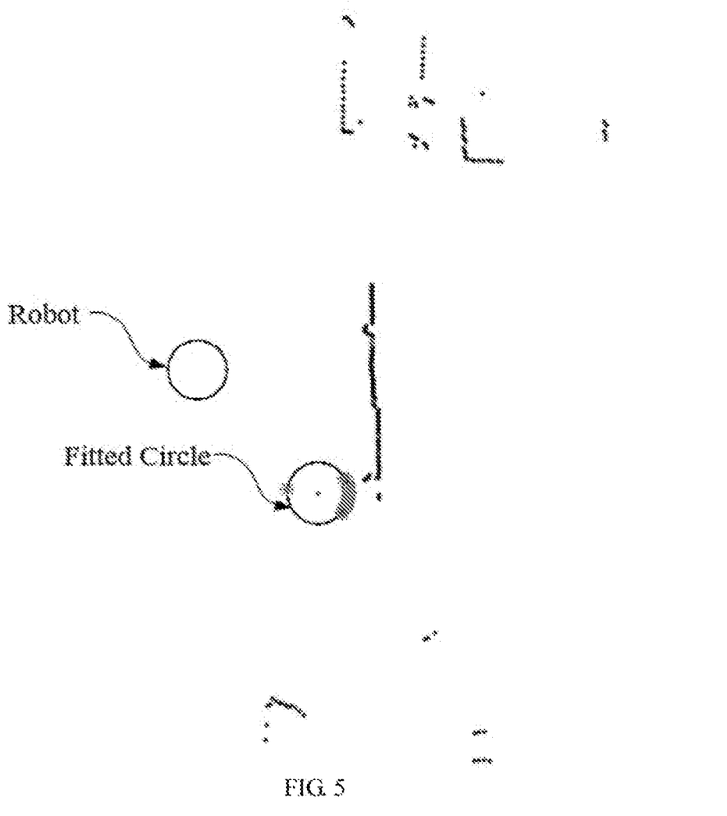
FIG. 5 is a schematic diagram of the radar data after fitting according to the robot recharge docking method of FIG. 4.

By determining whether the predetermined fitting shape matches the shape corresponding to the charging station, whether the target object is possible to be the charging station is determined. The plurality of predetermined fitting shapes obtained in step S22 are matched one by one with the shape corresponding to the determined charging station, that is, the shape of the charging surface of the charging station. In this embodiment, the radiuses of the fitted circles obtained by fitting the global radar data are matched one by one with the radius of the arc of the determined charging station so as to determine whether the radiuses of the two are within an error range and the covariance of the two is also within a specified error range. If so, the radius of the fitted circle can be determined as the radius of the arc of the charging station. FIG. 5 is a schematic diagram of the radar data after fitting according to the robot recharge docking method of FIG. 4. As shown in FIG. 5, a circle C is obtained by fitting using a least squares method. By matching the radius of the arc of the circle C with the radius of the arc of the known (i.e., determined) charging station, it can be determined whether the data of the fitted circle is the data of the arc charging station scanned by the radar. If so, it indicates that the target object is possible to be the charging station, and step S24 is executed; otherwise, S25 is executed.

S24: obtaining the position of the target object.

In one embodiment, after determining the radius of the arc of the charging station, the position of the center of the circle of the arc charging station can be further determined, and a target position and a target rotational angle at which the robot to be moved can be obtained. In one embodiment, if the radius of the arc of the charging station is the same as the radius of the chassis of the robot, the coordinate of the center of the arc of the charging station A in FIG. 2 is the target coordinate of the chassis to be moved, and the orientation of the robot is related to the position of the conductive sheet/wheel on the robot, for example, if the conductive sheet/wheel is directly behind the robot, the front of the robot coincides with the front of the charging station.

S25: determining whether the scan of the radar has timed out.

If it is determined that the plurality of predetermined fitting shapes within the current scanning range of the radar and the shape corresponding to the charging station do not match, the scan of radar can be determining as having timed out or not. If yes, step S7 is executed; otherwise, step S1 is executed to control the robot to rotate for a predetermined angle and continue scanning so as to obtain the current radar data of the scanned obstacle.

S3: controlling the robot to move to a predetermined position around the target object.

Figure 6:
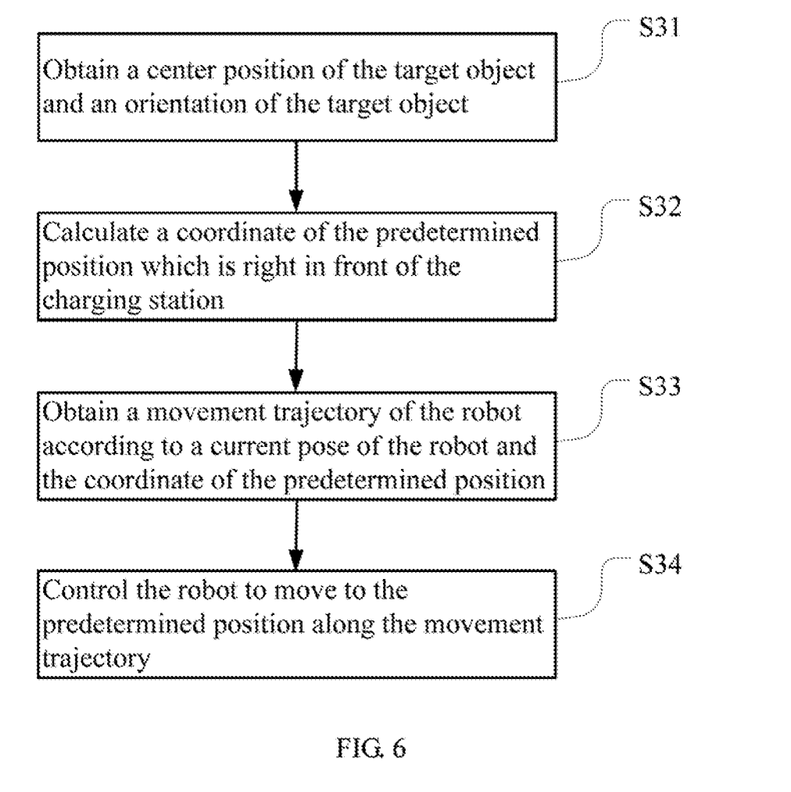
FIG. 6 is a flow chart of Step S3 of the robot recharge docking method of FIG. 1.

FIG. 6 is a flow chart of step S3 of the robot recharge docking method of FIG. 1. As shown in FIG. 6, step S3 further includes the following sub-steps.

S31: obtaining a center position of the target object and an orientation of the target object.

In this embodiment, through the above-mentioned fitting algorithm, the arc charging station can be obtained, and the position of the center of the circle of the charging station and the orientation of the charging station can be further determined.

S32: calculating a coordinate of the predetermined position which is right in front of the charging station.

In this embodiment, by using the radar to scan the obstacles first, the target object which is possible to be the charging station can be found at a relatively fast speed, and then the robot is moved to the front of the target object to verify that whether the target object is the charging station by using infrared. In which, the predetermined position may be a position right in front of the position of the center of the circle of the charging station for a distance of, for example, 0.3 meters, 0.4 meters, or 0.5 meters, which is not limited herein. In this embodiment, a position with the distance of 0.4 meters right in front of the charging station can be selected as the predetermined position.

S33: obtaining a movement trajectory of the robot according to a current pose of the robot and the coordinate of the predetermined position.

In this embodiment, the current pose includes a current position and a current posture. The movement trajectory of the robot for moving to the predetermined position is planned and determined according to the current position and posture of the robot and the coordinate of the predetermined position S34: controlling the robot to move to the predetermined position along the movement trajectory.

The robot is controlled to move to the predetermined position along the above-mentioned movement trajectory. In this embodiment, the path of the robot to move from the current position to the position of the predetermined coordinate may be determined in advance and stored directly in a control center of the robot, and the robot can be directly moved to the predetermined position according to the predetermined trajectory without performing path planning. In which, the predetermined trajectory may be a straight line or a curved line, which is not limited herein.

S4: determining whether infrared carrier data is received by the robot recharge docking apparatus from the target object.

If the infrared carrier data is received by the robot recharge docking apparatus from the target object, step S5 is executed; otherwise, step S7 is executed.

In this embodiment, after the robot is moved to the predetermined position, the robot is rotated such that an infrared receiver on the robot faces an infrared transmitter of the target object so as to receive infrared carrier data transmitted by the infrared transmitter of the target object. The infrared carrier data can be emitted regularly by using a microcontroller unit (MCU) of the target object to control the emission of infrared lights. The infrared carrier data may be 0x85. In other embodiments, other carrier such as 38K carrier may also be used, which is not limited herein.

S5: determining that the target object is the charging station upon receiving the infrared carrier data from the target object.

S6: docking the robot at the target object to charge if the target object is the charging station.

In step S6, if the robot detects the infrared carrier data emitted by the target object, it indicates that the target object is the charging station in correspondence with the robot. At this time, the robot is controlled to move to the position of the center of the circle of the target object (i.e., the target position) along a predetermined trajectory (a straight line or a curve line) and start charging. In this case, the radar recharge docking is successful.

S7: terminating.

In this embodiment, if the target object is determined as not the charging station or the scan of the radar has timed out, which indicates that the radar recharge docking fails, and the radar recharge docking is terminated.

In this embodiment, the provided robot recharge docking method is described in detail by taking an arc charging station as an example. However, in other embodiments, the charging station may be of any shape, and its scanning and identifying method is similar to the method for identifying the arc charging station, which will not be described herein.

In the above-mentioned embodiment, by using the radar scan to quickly find the charging station when the robot is docked to recharge, and using the infrared carrier data to verify the charging station, the robot can be prevent from taking an obstacle similar to a charging station in shape as the charging station to dock at, thereby ensuring the safety of the automatic recharging of the robot.

FIG. 7 is a schematic block diagram of a robot according to an embodiment of present disclosure. As shown in FIG. 7, a robot recharge docking apparatus of the robot includes a radar 10, a processor 11, and a memory 12, where the processor 11 is coupled to the radar 10 and the memory 12.

In which, the processor 11 is configured to obtain current radar data of the radar 10 of the robot for a scanned obstacle; obtain a position of a target object by analyzing the current radar data; control the robot to move to a predetermined position around the charging station; determine whether infrared carrier data is received by the robot recharge docking apparatus from the target object; determine that the target object is a charging station upon receiving the infrared carrier data from the target object; and dock the robot to the charging station to charge in response to the target object being the charging station.

In which, the processor 11 may also be referred to as a CPU (central processing unit). The processor 11 may be an integrated circuit chip having signal processing capability. The processor 11 may also be a general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In the above-mentioned apparatus, the processor can perform the corresponding steps in the above-mentioned method embodiments. Therefore, details are not described herein. For details, refer to the description of the corresponding steps.

In the above-mentioned embodiment, by using the radar scan to quickly find the charging station when the robot is docked to recharge, and using the infrared carrier data to verify the charging station, the robot can be prevent from taking an obstacle similar to a charging station in shape as the charging station to dock at, thereby ensuring the safety of the automatic recharging of the robot.

Figure 8:
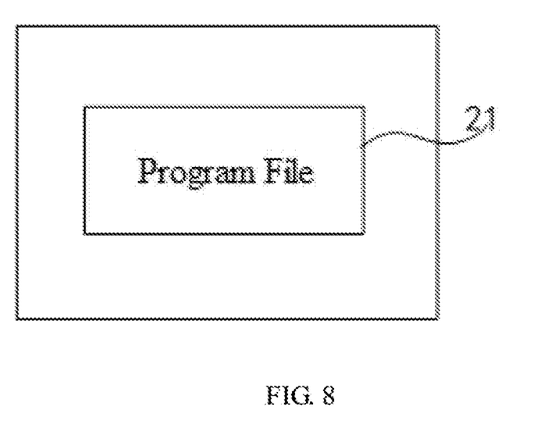
FIG. 8 is a schematic block diagram of a storage device according to an embodiment of present disclosure.

FIG. 8 is a schematic block diagram of a storage device according to an embodiment of present disclosure. As shown in FIG. 8, a storage device is provided. The storage device stores a program file 21 capable of implementing all of the above-mentioned methods. In which, the program file 21 may be stored in the storage device in the form of a software product, which includes a number of instructions for enabling a computer device (which can be a personal computer, a server, a network device, etc.) or a processor to execute all or a part of the steps of the methods described in each of the embodiments of the present disclosure. The above-mentioned storage device includes a variety of media such as a USB disk, a mobile hard disk, a read-only memory (ROM), a random access memory (RAM), a magnetic disk, and an optical disk which is capable of storing program codes, or a terminal device such as a computer, a server, a mobile phone, or a tablet.

In summary, those skilled in the art can easily understand that a robot recharge docking method and a robot with the same are provided, and by using the radar scan to quickly find the charging station when the robot is docked to recharge and using the infrared carrier data to verify the charging station, the robot can be prevent from taking an obstacle similar to a charging station in shape as the charging station to dock at, thereby ensuring the safety of the automatic recharging of the robot.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer implemented robot recharge docking method for a robot having a radar, comprising executing on a processor of a robot recharge docking apparatus the steps of:
obtaining current radar data of the radar of the robot for at least a scanned obstacle;
obtaining a position of a target object by analyzing the current radar data;
controlling the robot to move to a predetermined position around the target object;
determining whether infrared carrier data is received by the robot recharge docking apparatus from the target object;
determining that the target of is a charging station upon receiving the infrared carrier data from the target object; and
docking the robot at the target object to charge in response to the target object being the charging station;
wherein before the step of obtaining the current radar data of the radar of the robot for the scanned obstacle further comprises:
initializing the robot and parameters of the charging station.

2. The method of claim 1, wherein the step of obtaining the position of the target object by analyzing the current radar data comprises:
filtering the current radar data to obtain valid global radar data;
fitting the valid global radar data according to a front feature shape of the radar to obtain a plurality of predetermined fitting shapes;
determining whether the predetermined fitting shape matches a shape corresponding to charging station; and
obtaining the position of the target object in response to the predetermined fitting shape matching the shape corresponding to the charging station.

3. The method of claim 2, further comprising:
determining whether a scan of the radar has timed out in response to the predetermined fitting shape not matching the shape corresponding to the charging station; and
controlling the robot to rotate for a predetermined angle and continue scanning in response to the scan of the radar having not timed out.

4. The method of claim 2, wherein the valid global radar data is fitted by a least squares method to obtain a fitted circle.

5. The method of claim 4, wherein the charging station is an arc shape typed charging station, and the step of determining whether the predetermined fitting shape matches the shape corresponding to the charging station comprises:
determining whether a radius of the fitted circle and a radius of an arc of the charging station are within an error range and whether a covariance of the radius of the fitted circle and the radius of the arc of the charging station is within a specified error range.

6. The method of claim 1, wherein the step of controlling the robot to move to the predetermined position around the target object comprises:
obtaining a center position of the target object and an orientation of the target object;
calculating a coordinate of the predetermined position;
obtaining a movement trajectory of the robot according to a current pose of the robot and the coordinate of the predetermined position; and
controlling the robot to move to the predetermined position along the movement trajectory.

7. The method of claim 1, further comprising:
terminating in response to the target object being not a charging station.

8. The method of claim 1, wherein the parameter comprises at least one of a size of the charging station, an identification error range of the size, a covariance error range, a size of a chassis of the robot, a distance of the predetermined position and a center point of the charging station, a predetermined trajectory of the robot and a movement speed of the robot.

9. The method of claim 1, wherein after the step of controlling the robot to move to the predetermined position around the target object, the method further comprises:
controlling the robot rotating so that an infrared receiver on the robot faces an infrared transmitter of the target object.

10. The method of claim 1, wherein the current radar data comprises a size, an orientation and a distance of the obstacle with respect to the robot.

11. A robot, comprising:
a radar;
a memory;
a processor coupled to the memory; and
one or more computer programs stored in the memory and executable on the processor, wherein the one or more computer programs comprise:
instructions for obtaining current radar data of the radar of the robot for at least a scanned obstacle;
instructions for obtaining a position of a target object by analyzing the current radar data;
instructions for controlling the robot to move to a predetermined position around the target object;
instructions for determining whether infrared carrier data is received by the robot recharge docking apparatus from the target object;
instructions for determining that the target object is a charging station upon receiving the infrared carrier data from the target object;
instructions for docking the robot at the target object to charge in response to the target object being the charging station; and
instructions for initializing the robot and parameters of the charging station.

12. The robot of claim 11, wherein the instructions for obtaining the position of the target object by analyzing the current radar data comprise:
instructions for filtering the current radar data to obtain valid global radar data;
instructions for fitting the valid global radar data according to a front feature shape of the radar to obtain a plurality of predetermined fitting shapes;
instructions for determining whether the predetermined fitting shape matches a shape corresponding to charging station; and
instructions for obtaining the position of the target object in response to the predetermined fitting shape matching the shape corresponding to the charging station.

13. The robot of claim 12, wherein the one or more computer programs further comprise:

instructions for determining whether a scan of the radar has timed out in response to the predetermined fitting shape not matching the shape corresponding to the charging station; and instructions for controlling the robot to rotate for a predetermined angle and continue scanning in response to the scan of the radar having not timed out.

14. The robot of claim 12, wherein the valid global radar data is fitted by a least squares method to obtain a fitted circle.

15. The robot of claim 14, wherein the charging station is an arc shape typed charging station, and the instructions for determining whether the predetermined fitting shape matches a shape corresponding to charging station comprise:

instructions for determining whether a radius of the fitted circle and a radius of an arc of the charging station are within an error range and whether a covariance of the radius of the fitted circle and the radius of the arc of the charging station is within a specified error range.

16. The robot of claim 11, wherein the instructions for controlling the robot to move to the predetermined position around the target object comprise:

instructions for obtaining a center position of the target t object and an orientation of the target object;

instructions for calculating a coordinate of the predetermined position;

instructions for obtaining a movement trajectory of the robot according to a current pose of the robot and the coordinate of the predetermined position; and instructions for controlling the robot to move to the predetermine position along the movement trajectory.

17. The robot of claim 11, wherein the one or more computer programs further comprise:

instructions for terminating in response to the target object being not a charging station.

18. The robot of claim 11, wherein the parameter comprises at least one of a size of the charging station, an identification error range of the size, a covariance error range, a size of a chassis of the robot, a distance of the predetermined position and a center point of the charging station, a predetermined trajectory of the robot, and a movement speed of the robot.

19. The robot of claim 11, wherein the current radar data comprises a size, an orientation and a distance of the obstacle with respect to the robot.

20. The robot of claim 11, wherein the one or more computer programs further comprise:

instructions for controlling the robot rotating so that an infrared receiver on the robot faces an infrared transmitter of the target object.

* * * * *